United States Patent
Yang et al.

(10) Patent No.: US 10,574,055 B2
(45) Date of Patent: Feb. 25, 2020

(54) TRANSIENT POWER STABILIZATION DEVICE WITH ACTIVE AND REACTIVE POWER CONTROL

(71) Applicant: Flexgen Power Systems, Inc., Houston, TX (US)

(72) Inventors: Mengbin Yang, Raleigh, NC (US); Pasi Taimela, Wake Forest, NC (US); Tony Olivo, Raleigh, NC (US); Robert William Johnson, Jr., Raleigh, NC (US); Gopalakrishnan Balakrishnan, Katy, TX (US)

(73) Assignee: Flexgen Power Systems, Inc., Houston, TX (US)

( * ) Notice: Subject to any disclaimer, the term of this patent is extended or adjusted under 35 U.S.C. 154(b) by 152 days.

(21) Appl. No.: 15/539,772

(22) PCT Filed: Dec. 22, 2015

(86) PCT No.: PCT/US2015/067347
§ 371 (c)(1),
(2) Date: Jun. 26, 2017

(87) PCT Pub. No.: WO2016/109330
PCT Pub. Date: Jul. 7, 2016

(65) Prior Publication Data
US 2018/0013288 A1    Jan. 11, 2018

Related U.S. Application Data

(60) Provisional application No. 62/097,691, filed on Dec. 30, 2014.

(51) Int. Cl.
*H02J 1/10*      (2006.01)
*H02J 3/06*      (2006.01)
(Continued)

(52) U.S. Cl.
CPC .................... *H02J 3/24* (2013.01); *H02J 3/18* (2013.01); *H02J 3/32* (2013.01); *H02J 3/46* (2013.01)

(58) Field of Classification Search
CPC .... H02J 3/24; H02J 3/28; H02J 3/1842; H02J 3/18; H02J 3/32
See application file for complete search history.

(56) References Cited

U.S. PATENT DOCUMENTS

| 4,992,920 A | 2/1991 | Davis |
| 5,327,336 A * | 7/1994 | Ohkubo .................... H02J 3/46 363/35 |

(Continued)

FOREIGN PATENT DOCUMENTS

| CN | 103 490 450 A | 1/2014 |
| DE | 3311299 | 10/1984 |

(Continued)

OTHER PUBLICATIONS

Anwar, et al., Supercapacitor Energy Storage for Low-Voltage Ride Through in a 13.8KV AC System, 2010 IEEE, pp. 189-192.

(Continued)

*Primary Examiner* — Rexford N Barnie
*Assistant Examiner* — Rasem Mourad
(74) *Attorney, Agent, or Firm* — Stanek Lemon Crouse & Meeks, P.A.

(57) ABSTRACT

A system includes a converter configured to be coupled between an energy storage unit and a grid and a control circuit configured to detect frequency and voltage variations of the grid and to responsively cause the converter to transfer power and reactive components to and/or from the grid. The control circuit may implement a power control loop having an inner frequency control loop and a reactive component control loop having an inner voltage control loop. The control circuit may provide feedforward from the inner (Continued)

frequency control loop to the inner voltage control loop to inhibit reactive component transfer in response to a voltage variation deviation of the grid due to a power transfer between the energy storage unit and the grid.

10 Claims, 3 Drawing Sheets

(51) Int. Cl.
*H02J 3/46* (2006.01)
*H02J 3/24* (2006.01)
*H02J 3/32* (2006.01)
*H02J 3/18* (2006.01)

(56) References Cited

U.S. PATENT DOCUMENTS

| | | |
|---|---|---|
| 5,563,802 A | 10/1996 | Plahn et al. |
| 5,734,205 A | 3/1998 | Okamura et al. |
| 5,907,192 A | 5/1999 | Lyons et al. |
| 5,929,538 A | 7/1999 | O'Sullivan et al. |
| 6,038,118 A | 3/2000 | Guerra |
| 6,104,102 A | 8/2000 | Tsuji |
| 6,128,204 A | 10/2000 | Munro et al. |
| 6,175,217 B1 | 1/2001 | Da Ponte et al. |
| 6,252,753 B1 | 6/2001 | Bhargava |
| 6,265,851 B1 | 7/2001 | Brien et al. |
| 6,317,343 B1 | 11/2001 | Okamura et al. |
| 6,703,722 B2 | 3/2004 | Christensen |
| 6,870,279 B2 | 3/2005 | Gilbreth et al. |
| 6,879,053 B1 | 4/2005 | Welches et al. |
| 6,958,550 B2 | 10/2005 | Gilbreth et al. |
| 6,969,922 B2 | 11/2005 | Welches et al. |
| 7,002,260 B2 | 2/2006 | Stahlkopf |
| 7,116,010 B2 | 10/2006 | Lasseter et al. |
| 7,184,903 B1 | 2/2007 | Williams et al. |
| 7,391,126 B2 | 6/2008 | Liu et al. |
| 7,474,016 B2 | 1/2009 | Wang et al. |
| 7,476,987 B2 | 1/2009 | Chang |
| 7,514,808 B2 | 4/2009 | Wobben |
| 7,560,906 B2 | 7/2009 | Liu et al. |
| 7,612,466 B2 | 11/2009 | Skutt |
| 7,642,755 B2 | 1/2010 | Bartilson |
| 7,675,187 B2 | 3/2010 | Woods et al. |
| 7,680,562 B2 | 3/2010 | Delmerico et al. |
| 7,701,087 B2 | 4/2010 | Eckroad et al. |
| 7,781,902 B2 | 8/2010 | Cerney et al. |
| 7,787,272 B2 | 8/2010 | Lasseter et al. |
| 7,834,479 B2 | 11/2010 | Capp et al. |
| 7,855,467 B2 | 12/2010 | Kawazoe et al. |
| 7,906,862 B2 | 3/2011 | Donnelly et al. |
| 7,969,030 B2 | 6/2011 | Woods et al. |
| 8,022,572 B2 | 9/2011 | Vyas et al. |
| 8,080,898 B2 | 12/2011 | Fukuhara |
| 8,099,198 B2 | 1/2012 | Gurin |
| 8,164,217 B1 | 4/2012 | Miller |
| 8,222,756 B2 | 7/2012 | Koeneman et al. |
| 8,227,929 B2 | 7/2012 | Burra et al. |
| 8,315,745 B2 | 11/2012 | Creed |
| 8,338,987 B2 | 12/2012 | O'Brien et al. |
| 8,452,688 B1 | 5/2013 | Sharplin et al. |
| 8,492,913 B2 | 7/2013 | Koeneman et al. |
| 8,498,752 B2 | 7/2013 | Wells |
| 8,532,834 B2 | 9/2013 | Delong et al. |
| 8,558,510 B2 | 10/2013 | Moon |
| 8,688,281 B2 | 4/2014 | Viassolo et al. |
| 8,751,036 B2 | 6/2014 | Darden, II et al. |
| 8,766,474 B2 | 7/2014 | Carralero et al. |
| 8,810,066 B2 | 8/2014 | Moon |
| 8,829,698 B2 | 9/2014 | Koeneman et al. |
| 8,831,788 B2 | 9/2014 | Flynn et al. |
| 8,849,469 B2 | 9/2014 | Belady et al. |
| 8,866,334 B2 | 10/2014 | Donnelly et al. |
| 8,922,056 B2 | 12/2014 | Thisted |
| 8,922,062 B2 | 12/2014 | Johnson et al. |
| 8,938,323 B2 | 1/2015 | Lee |
| 8,946,916 B2 | 2/2015 | Tarnowski |
| 8,946,929 B2 | 2/2015 | Singh et al. |
| 8,975,767 B2 | 3/2015 | Algrain |
| 9,026,259 B2 | 5/2015 | Zadeh et al. |
| 9,026,260 B1 | 5/2015 | Thornley et al. |
| 9,042,141 B2 | 5/2015 | Yu et al. |
| 2002/0017822 A1 | 2/2002 | Umemura et al. |
| 2002/0190525 A1 | 12/2002 | Worden et al. |
| 2002/0198648 A1 | 12/2002 | Gilbreth et al. |
| 2003/0047209 A1 | 3/2003 | Yanai et al. |
| 2003/0080622 A1 | 5/2003 | Koenig |
| 2004/0051387 A1 | 3/2004 | Lasseter et al. |
| 2004/0084965 A1 | 5/2004 | Welches et al. |
| 2004/0240244 A1 | 12/2004 | Yamamoto |
| 2004/0245783 A1 | 12/2004 | Gilbreth et al. |
| 2005/0012395 A1 | 1/2005 | Eckroad et al. |
| 2005/0043859 A1 | 2/2005 | Tsai et al. |
| 2005/0077881 A1 | 4/2005 | Capp |
| 2005/0154499 A1 | 7/2005 | Aldridge et al. |
| 2005/0200133 A1 | 9/2005 | Wobben |
| 2006/0192433 A1 | 8/2006 | Fuglevand et al. |
| 2006/0192435 A1 | 8/2006 | Parmley |
| 2007/0024227 A1 | 2/2007 | Kunkel et al. |
| 2007/0182158 A1 | 8/2007 | Cerney et al. |
| 2007/0210652 A1 | 9/2007 | Tracy et al. |
| 2007/0228836 A1 | 10/2007 | Teichmann |
| 2007/0267871 A1 | 11/2007 | Gregory |
| 2008/0088183 A1 | 4/2008 | Eckroad et al. |
| 2008/0203734 A1 | 8/2008 | Grimes et al. |
| 2008/0211230 A1 | 9/2008 | Gurin |
| 2008/0278000 A1 | 11/2008 | Capp et al. |
| 2009/0024255 A1* | 1/2009 | Penzenstadler ....... H02J 3/1842 700/297 |
| 2009/0072623 A1 | 3/2009 | Liao |
| 2009/0086520 A1 | 4/2009 | Nishimura |
| 2009/0140576 A1 | 6/2009 | Yu et al. |
| 2009/0189456 A1 | 7/2009 | Skutt |
| 2009/0195074 A1 | 8/2009 | Buiel |
| 2009/0312885 A1 | 12/2009 | Buiel |
| 2010/0008119 A1 | 1/2010 | O'Brien et al. |
| 2010/0096918 A1 | 4/2010 | Sawada et al. |
| 2010/0138066 A1 | 6/2010 | Kong |
| 2010/0264739 A1 | 10/2010 | Errington |
| 2010/0270864 A1* | 10/2010 | Vyas ...................... H02J 7/35 307/82 |
| 2010/0292853 A1 | 11/2010 | McDonnell |
| 2010/0327800 A1 | 12/2010 | Reineccius |
| 2011/0060474 A1 | 3/2011 | Schmiegel et al. |
| 2011/0062708 A1 | 3/2011 | Prochaska et al. |
| 2011/0068631 A1 | 3/2011 | Roscoe |
| 2011/0080044 A1 | 4/2011 | Schmiegel |
| 2011/0115295 A1 | 5/2011 | Moon et al. |
| 2011/0118894 A1 | 5/2011 | Reineccius et al. |
| 2011/0133558 A1 | 6/2011 | Park |
| 2011/0140520 A1 | 6/2011 | Lee |
| 2011/0140648 A1 | 6/2011 | Lee |
| 2011/0144822 A1 | 6/2011 | Choi |
| 2011/0148195 A1 | 6/2011 | Lee |
| 2011/0148360 A1 | 6/2011 | Lee |
| 2011/0204720 A1 | 8/2011 | Ruiz |
| 2011/0227340 A1 | 9/2011 | Rozman |
| 2011/0248569 A1 | 10/2011 | Son et al. |
| 2011/0260546 A1 | 10/2011 | Hashizume et al. |
| 2011/0266871 A1* | 11/2011 | Thisted ................... H02J 7/34 307/46 |
| 2011/0273022 A1 | 11/2011 | Dennis et al. |
| 2011/0309690 A1 | 12/2011 | West |
| 2012/0025614 A1 | 2/2012 | Taimela et al. |
| 2012/0029897 A1 | 2/2012 | Cherian et al. |
| 2012/0033473 A1 | 2/2012 | Scharf |
| 2012/0046798 A1 | 2/2012 | Orthlieb et al. |
| 2012/0068540 A1 | 3/2012 | Luo et al. |
| 2012/0080942 A1 | 4/2012 | Carralero et al. |
| 2012/0083927 A1 | 4/2012 | Nakamura et al. |
| 2012/0089261 A1 | 4/2012 | Kim |
| 2012/0143383 A1 | 6/2012 | Cooperrider et al. |
| 2012/0146412 A1 | 6/2012 | Harrison |

(56) References Cited

U.S. PATENT DOCUMENTS

| | | |
|---|---|---|
| 2012/0146423 A1 | 6/2012 | Bodewes et al. |
| 2012/0147637 A1 | 6/2012 | Petter |
| 2012/0166013 A1 | 6/2012 | Park et al. |
| 2012/0215368 A1 | 8/2012 | Sharma |
| 2012/0239215 A1 | 9/2012 | Timbus et al. |
| 2012/0267952 A1 | 10/2012 | Ballatine et al. |
| 2012/0283887 A1 | 11/2012 | Goldsmith et al. |
| 2012/0283890 A1 | 11/2012 | Fu et al. |
| 2012/0287690 A1 | 11/2012 | Paatero |
| 2012/0292992 A1 | 11/2012 | Williams |
| 2012/0323396 A1 | 12/2012 | Shelton et al. |
| 2013/0015703 A1 | 1/2013 | Rouse et al. |
| 2013/0035802 A1 | 2/2013 | Khaitan et al. |
| 2013/0041516 A1 | 2/2013 | Rockenfeller et al. |
| 2013/0043825 A1 | 2/2013 | Diedrichs et al. |
| 2013/0062953 A1 | 3/2013 | Nurmi |
| 2013/0088084 A1 | 4/2013 | Szu |
| 2013/0099581 A1 | 4/2013 | Zhou et al. |
| 2013/0116844 A1 | 5/2013 | McNally et al. |
| 2013/0141956 A1 | 6/2013 | Chiang et al. |
| 2013/0158901 A1 | 6/2013 | Sahinoglu et al. |
| 2013/0166084 A1 | 6/2013 | Sedighy et al. |
| 2013/0169309 A1 | 7/2013 | Bickel |
| 2013/0187454 A1 | 7/2013 | Timbus et al. |
| 2013/0238151 A1 | 9/2013 | Vaum et al. |
| 2013/0241495 A1 | 9/2013 | Min |
| 2013/0285446 A1 | 10/2013 | Chow et al. |
| 2013/0342020 A1 | 12/2013 | Blevins et al. |
| 2014/0025217 A1 | 1/2014 | Jin et al. |
| 2014/0032000 A1 | 1/2014 | Chandrashekhara |
| 2014/0058571 A1 | 2/2014 | Hooshmand et al. |
| 2014/0078625 A1 | 3/2014 | Zheng et al. |
| 2014/0084682 A1 | 3/2014 | Covic et al. |
| 2014/0088778 A1 | 3/2014 | Nguyen |
| 2014/0088781 A1 | 3/2014 | Kearns et al. |
| 2014/0097683 A1 | 4/2014 | Piyabongkarn et al. |
| 2014/0100705 A1 | 4/2014 | Shi et al. |
| 2014/0103655 A1 | 4/2014 | Burra et al. |
| 2014/0103724 A1 | 4/2014 | Wagoner |
| 2014/0103727 A1* | 4/2014 | Taimela ............... H02J 3/24 307/76 |
| 2014/0103855 A1 | 4/2014 | Wolter |
| 2014/0129042 A1 | 5/2014 | Miner |
| 2014/0148960 A1 | 5/2014 | Bhageria et al. |
| 2014/0152110 A1* | 6/2014 | Sugimoto ............... H02J 4/00 307/66 |
| 2014/0183949 A1 | 7/2014 | Murano |
| 2014/0188300 A1 | 7/2014 | Nguyen |
| 2014/0191507 A1 | 7/2014 | Holmberg et al. |
| 2014/0200722 A1 | 7/2014 | Bhavaraju |
| 2014/0214223 A1 | 7/2014 | Tsunoda et al. |
| 2014/0217826 A1 | 8/2014 | Oguchi et al. |
| 2014/0225457 A1 | 8/2014 | Elliott, II |
| 2014/0229031 A1 | 8/2014 | Amarin et al. |
| 2014/0249686 A1 | 9/2014 | Brainard et al. |
| 2014/0265596 A1 | 9/2014 | Yuan et al. |
| 2014/0292259 A1 | 10/2014 | Kim et al. |
| 2014/0306533 A1 | 10/2014 | Paquin et al. |
| 2014/0306534 A1 | 10/2014 | Shi et al. |
| 2014/0312882 A1 | 10/2014 | Dong et al. |
| 2014/0316593 A1 | 10/2014 | Taimela et al. |
| 2014/0324243 A1 | 10/2014 | Markowz et al. |
| 2014/0337002 A1 | 11/2014 | Manto |
| 2014/0354234 A1 | 12/2014 | Sudan et al. |
| 2014/0375125 A1 | 12/2014 | Ye et al. |
| 2015/0001931 A1 | 1/2015 | Banham-Hall et al. |
| 2015/0008737 A1 | 1/2015 | Mao |
| 2015/0019034 A1 | 1/2015 | Gonatas |
| 2015/0021998 A1 | 1/2015 | Trescases et al. |
| 2015/0032278 A1 | 1/2015 | Bhageria et al. |
| 2015/0039145 A1 | 2/2015 | Yang et al. |
| 2015/0081124 A1 | 3/2015 | Ekanayake et al. |
| 2015/0094871 A1 | 4/2015 | Bhageria et al. |
| 2015/0097437 A1 | 4/2015 | Votoupal et al. |
| 2015/0105931 A1 | 4/2015 | Forbes, Jr. |
| 2015/0109836 A1* | 4/2015 | Hatakeyama ........... H02J 3/381 363/97 |

FOREIGN PATENT DOCUMENTS

| | | |
|---|---|---|
| DE | 69 707 704 D1 | 11/2001 |
| DE | 69 707 704 T2 | 6/2002 |
| DE | 10 2007 005352 A1 | 8/2007 |
| EP | 0 947 042 B1 | 10/2001 |
| EP | 1 638 184 | 3/2006 |
| EP | 1 638 184 A2 | 3/2006 |
| EP | 2 251 953 A2 | 11/2010 |
| EP | 2 325 970 A2 | 5/2011 |
| EP | 2 330 726 A2 | 6/2011 |
| EP | 2 337 178 A2 | 6/2011 |
| EP | 2 337 184 A2 | 6/2011 |
| EP | 2 339 714 A2 | 6/2011 |
| EP | 2 380 769 A1 | 10/2011 |
| EP | 1 866 717 B1 | 6/2012 |
| EP | 2 782 204 | 9/2014 |
| EP | 2 782 204 A1 | 9/2014 |
| GB | 2434928 A | 8/2007 |
| GB | 2434928 B | 4/2010 |
| GB | 2 483 879 A | 3/2012 |
| JP | 2001-507199 A | 5/2001 |
| JP | 2011-109901 A | 6/2011 |
| WO | WO 98/28832 A1 | 7/1998 |
| WO | WO 99/32762 A1 | 7/1999 |
| WO | WO 02/17475 A1 | 2/2002 |
| WO | WO 2004/038892 A2 | 5/2004 |
| WO | WO 2004/054065 A1 | 6/2004 |
| WO | WO 2005/101610 A2 | 10/2005 |
| WO | WO 2006/094128 A2 | 9/2006 |
| WO | WO 2007/018830 A2 | 2/2007 |
| WO | WO 2008/039725 A2 | 4/2008 |
| WO | WO 2008/125696 A2 | 10/2008 |
| WO | WO 2009/128079 A1 | 10/2009 |
| WO | WO 2009/144737 A1 | 12/2009 |
| WO | WO 2010/038152 A1 | 4/2010 |
| WO | WO 2010/042550 A2 | 4/2010 |
| WO | WO 2011/008505 A2 | 1/2011 |
| WO | WO 2011/008506 A2 | 1/2011 |
| WO | WO 2011/020149 A1 | 2/2011 |
| WO | WO 2011/124657 A1 | 10/2011 |
| WO | WO 2012/015508 A1 | 2/2012 |
| WO | WO 2012/064906 A2 | 5/2012 |
| WO | WO 2013/008413 A1 | 1/2013 |
| WO | WO 2013/008413 | 2/2013 |
| WO | WO 2013/102791 | 7/2013 |
| WO | WO 2013/102791 A1 | 7/2013 |
| WO | WO 2014/071948 A1 | 5/2014 |

OTHER PUBLICATIONS

EPCC Electronic Power Control & Conditioning Module, Jan. 2010, www.nextenergy.org, 6 pages.

IEEE Spectrum: Circuit Could Swap Ultracapacitors for Batteries, http://spectrum.ieee.org/Semiconductors/design/circuit-could-swap-ultracapacitors-for-batter . . . , Jun. 21, 2010, 2 pages.

Kotz R. et al., "Principles and applications of electrochemical capacitors", *Electrochimica Acta*, vol. 45 (2000), pp. 2483-2498.

Nomoto S. et al., "Advanced capacitors and their application", *Journal of Power Sources*, 97-98 (2001), pp. 807-811.

Ultra Capacitor, Power Conditioning Solutions, Unirom Electronics Ltd., www.unirom.co.il, Printed Jun. 18, 2010, 8 pages.

Unirom Electronics Presentation, Semicon Japan 2008, pp. 1-30.

U.S. Appl. No. 14/190,398, filed Feb. 26, 2014 entitled "Hybrid Energy Storage System and Methods,".

U.S. Appl. No. 61/771,403, filed Mar. 1, 2013 entitled "Hybrid Energy Storage System and Methods,".

Notification Concerning Transmittal of International Preliminary Report on Patentability, PCT/US2015/067347, dated Jul. 4, 2017, 7 pages.

International Search Report and Written Opinion, PCT/US2015/067347, dated Mar. 7, 2017, 2 pages.

(56) References Cited

OTHER PUBLICATIONS

Extended European Search Report, EP 15 876 046.2, dated May 7, 2018, 11 pages.
Sato et al., Novel Control Strategy of Instantaneous Power Based CVCF Inverter, IEEE $7^{th}$ International Conference on Power Electronics and Drive Systems, Nov. 27, 2007, pp. 1502-1507.
Communication pursuant to Article 94(3) EPC, EP 15 876 046.2, dated May 24, 2019, 6 pages.
Examination report No. 1 for standard patent application, AU Application No. 2015374405, dated May 29, 2019, 4 pages.
European Office Action, EP 15 876 046.2, dated Dec. 4, 2019, 3 pages.

* cited by examiner

TRANSIENT POWER STABILIZATION DEVICE WITH ACTIVE AND REACTIVE POWER CONTROL

RELATED APPLICATIONS

The present application is a 35 U.S.C. § 371 national phase application of PCT International Application No. PCT/US2015/067347, having an international filing date of Dec. 22, 2015, and claims the benefit of U.S. Provisional Application Ser. No. 62/097,691, filed Dec. 30, 2015, the contents of which are incorporated herein by reference in their entireties.

FIELD

The present inventive subject matter generally relates to power systems and methods of operating the same and, more particularly, to power systems driven by generators and methods of operating the same

BACKGROUND

In island grid applications, generating assets, such as diesel or gas powered generators and turbines, may experience transient load conditions that can cause changes in grid frequency and voltage. These transient conditions may include, for example, large load changes and sudden changes in power source availability, such as a fuel-powered generator shutting down or a variation in supply from a generating asset such as a wind or solar generator. Such variations in line frequency may result in dropped loads or damaged equipment. Such problems may be particularly pronounced in systems that use engine/generator sets powered by natural gas or other lower energy density fuels.

Island grid generators are often sized with significant excess rated continuous power capacity in order to carry peak loads, respond to large transient load steps, and provide redundancy in support of mission-critical operations. They may operate at very high utilization rates, for example, 24 hours a day, 7 days a week, 365 days a year, but at relatively low real load factors, commonly between 15-50%, for extended periods of off-peak time. Furthermore, manufacturer warranty requirements may result in additional costs due to the use of self-imposed, manual load banks. This operating profile may result in lower fuel efficiency, excessive wear and tear on generators, and notable increases in particulate matter (PM) and hydrocarbon (HC) emissions due to the incomplete combustion of diesel or natural gas fuel.

In island grind and other off-grid applications, the magnitude of load steps can exceed the incremental step capability of the available generation. In these cases, the load steps can cause under/over voltage or frequency of the load bus. This may result in damage to any grid-connected devices, such as motors and transformers and the like, that are typically designed to operate at or near the nominal voltage and frequency. Because of the potential for such damage, a generator may have protective circuits that disconnect the generator from the load bus, thus protecting such equipment but resulting in a possible blackout or loss of load. In some demanding applications, there are loads that require huge current magnitudes which would require multiple parallel generators to meet this demand to start these demanding loads and maintain the power and reactive components within the generator specifications under transient conditions. Once the load is started, the steady state load is relatively small, which does not require the operation of all these generators. The load steps can be predominately resistive which results in a change in active power. Load steps can also be reactive, which results in a change in volt-Amperes Reactive (VAR).

SUMMARY

Some embodiments of the inventive subject matter provide a system including a converter configured to be coupled between an energy storage unit and a grid and a control circuit configured to detect frequency and voltage variations of the grid and to responsively cause the converter to transfer power and reactive components thereto. In some embodiments, the control circuit may implement a power control loop having an inner frequency control loop and a reactive component control loop having an inner voltage control loop. The control circuit may provide feedforward from the inner frequency control loop to the inner voltage control loop to inhibit reactive component transfer in response to a voltage variation deviation of the grid.

In some embodiments, the power and reactive component control loops are configured to drive power and reactive transfers by the converter to substantially zero when a frequency and a voltage of the grid meet predetermined criteria. In further embodiments, the control circuit may be configured to provide power flow from the grid to the energy storage unit by varying a power reference provided to the power control loop when the frequency and the voltage of the grid meet the predetermined criteria. The control circuit may be configured to cause the converter to maintain a frequency and a voltage of the grid within ranges that prevent shutdown of an engine/generator set driving the grid in response to a startup of a motor coupled to the grid.

In some embodiments, the control circuit may be configured to inhibit reactive component transfer in response to a voltage variation deviation due to a power transfer between the grid and the energy storage unit.

In further embodiments, the control circuit may be configured to detect transient frequency and voltage variations of the grid associated with a startup of a motor load on the grid and to responsively cause the converter to transfer power and reactive components until the motor load reaches a steady state.

Some embodiments provide a system including at least one engine/generator set coupled to a grid and a transient frequency and voltage stabilization system including an energy storage unit and configured to detect a frequency variation and a voltage variation deviation of the grid and to responsively perform a momentary transfer of energy and a compensating reactive component thereto. Voltage variation deviation of the grid due to a power component may be decoupled, inhibiting compensating reactive component from being injected to disturb the grid.

In some embodiments, the transient frequency and voltage stabilization system may be configured to detect a frequency variation and a voltage variation of the grid in response to a startup of a motor load and to responsively perform a momentary transfer of energy and a compensating reactive component.

Further embodiments provide methods including detecting frequency and voltage variations of a grid due associated with a startup of a motor load on the grid and causing a converter to transfer power and reactive components to and/or from the grid responsive to the detected frequency and voltage variations. Causing a converter to transfer power and reactive components may be followed by reducing transfer of the power and reactive components responsive to a reduction of the variations.

DETAILED DESCRIPTION OF EMBODIMENTS

Figure 1:
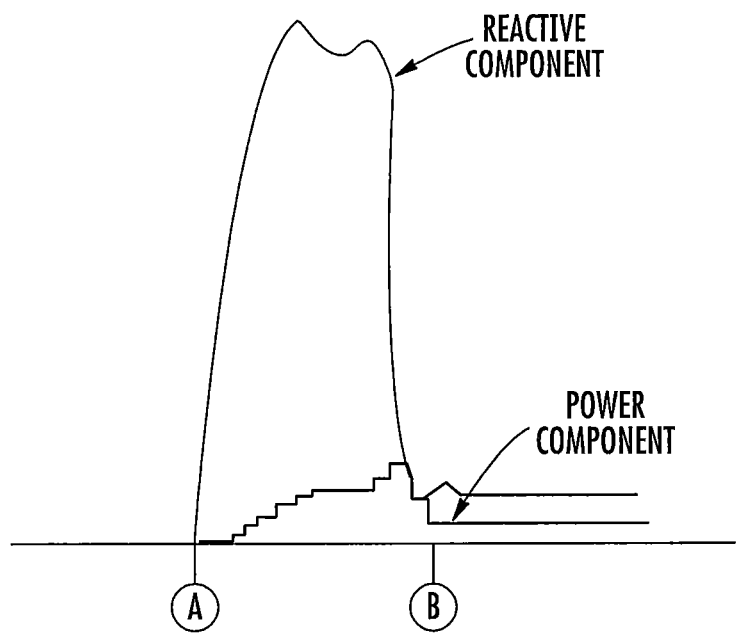
FIG. 1 is a diagram illustrating an exemplary 1MW compressor start-up current profile (power and reactive components).

The present inventive subject matter will be described more fully hereinafter with reference to the accompanying figures, in which embodiments of the inventive subject matter are shown. This inventive subject matter may, however, be embodied in many alternate forms and should not be construed as limited to the embodiments set forth herein.

Accordingly, while the inventive subject matter is susceptible to various modifications and alternative forms, specific embodiments thereof are shown by way of example in the drawings and will herein be described in detail. It should be understood, however, that there is no intent to limit the inventive subject matter to the particular forms disclosed, but on the contrary, the inventive subject matter is to cover all modifications, equivalents, and alternatives falling within the spirit and scope of the inventive subject matter as defined by the claims. Like numbers refer to like elements throughout the description of the figures.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive subject matter belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, in some demanding applications, there are loads that require huge current magnitudes which would require multiple parallel generators to meet this demand to start these demanding loads and maintain the power and reactive components within the generator specifications under transient conditions. Once the load is started, the steady state load is relatively small, which does not require the operation of all these generators. The load steps can be predominately resistive which results in a change in active power (W) or the load steps can be reactive which results in a change in Volt-Ampere reactive (VAR) or a combination of both.

Accordingly, some embodiments of the inventive subject matter provide transient frequency and voltage stabilization systems and methods that may be used in island grid, utility grid, off-grid, grid-edge and other applications. In such applications, it may be possible to reduce, or possibly eliminate, the number of additional generators required to support the transient to start these demanding loads and maintain the power and reactive components within the generator specifications under transient and steady-state operation.

According to some embodiments, a Solid State Generator (SSG) offers a solution that supplies the load transient required by the load, allowing the generator to respond to a lower rate of load application that will maintain the load voltage and frequency within specifications. For the predominately resistive load step, the time shifting of the load step may be accomplished by using a form of energy store, such as capacitors or electrochemical storage. The compensation for the reactive component may not require any substantial energy store. In some embodiments, resistive and reactive components of a load step can be compensated by observing terminal characteristics of the SSG power terminals without requiring access to control circuitry of the generator. Thus, a transient stabilization system according to some embodiments may be configured as a "drop-in" device that may be connected to the grid without requiring communication with an engine/generator set and/or system controller.

On an off-grid or island grid application, a large load step from a motor or compressor start-up presents a formable challenge. The engine/generator sets are limited in resistive load step capability. For example, a diesel engine generator set can typically accept a maximum 50% load step while maintaining a less than 5% (e.g., +−2.5 Hz) frequency change. If the engine generator set is natural gas, the typical maximum load step to maintain the same frequency bounds is limited to only 10%. The reactive component of the load can also present a problem for the voltage regulator of the engine/generator set.

Exceeding the reactive component capability of the generator can cause the generator to trip-off line or disconnect from the load bus. Although we have discussed the problem as related to prime movers found in engine/generator sets, the problem may occur with a variety of types of generators, including those using turbines, micro turbines, linear/free piston engines, Wankel, fuel cells and the like.

During the motor start-up, large amounts of resistive and reactive components typically must be supplied to the load or the load bus will deviate outside acceptable range, which can cause the engine/generator sets to trip-off. FIG. 1 illustrates an example in which a 1.0 MW compressor is started. The compressor starting event begins at point A and ends at point B. With a soft starter, this starting event is 20 seconds in duration and the load has peak demands of 2.0 MW of power and 15 MVA of a reactive component, which far exceeds the capability of a typical engine/generator set.

Figure 2:
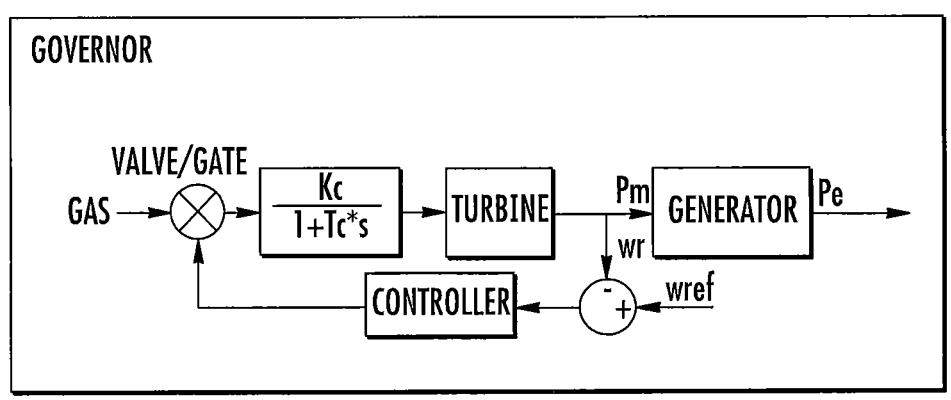
FIG. 2 is a diagram illustrating a typical governor control architecture for an engine/generator set.

FIG. 2 illustrates a typical governor for an engine/generator set. Step loading of the engine/generator set causes the load bus frequency and output voltage to droop because the generator slows down. The typical regulator is not able to increase the engine/generator set power fast enough in 20 seconds to prevent the bus voltage and frequency from dropping out of specification, where the response time is dependent on the time constant of the generator valve/gate control.

During the compressor startup period, the load current profile presents a large problem for an induction generator since its inductive impedance and the line inductance can be substantial. Because of the large magnitude of the transient reactive component in the load, the bus voltage will drop during the compressor startup event.

The amount of the voltage drop can be estimated using the following equations:

$$\Delta U = R^* \Delta Pc + X^* \Delta Qc \qquad \text{Eqn. (1)}$$

where,
 $\Delta U$=Bus voltage drop;
 R=System resistive impedance, including the generator resistance;
 X=System reactive impedance, including the generator reactance;
 $\Delta Pe$=transient power step; and
 $\Delta Qe$=transient reactive step.

Figure 3:
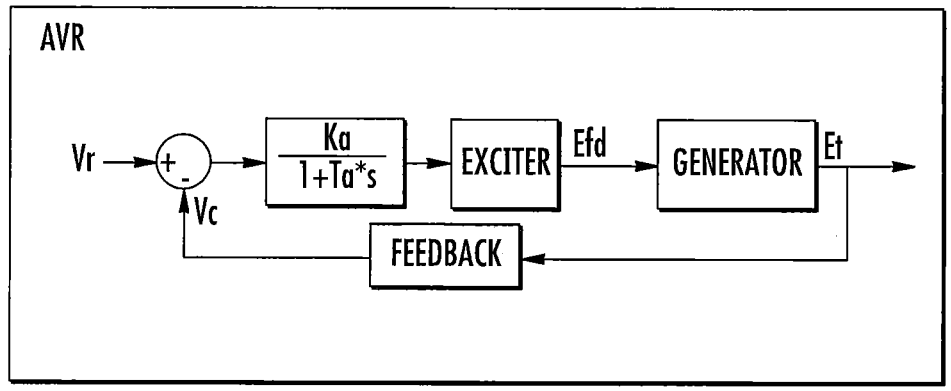
FIG. 3 is a block diagram illustrating a typical Automatic Voltage Regulator (AVR) for an engine/generator set.

FIG. 3 illustrates a typical control architecture for the engine/generator set automatic voltage regulator (AVR). During compressor start up, the AVR may not be able to adjust the voltage fast enough due to delays in the excitation system response.

To mitigate the startup currents, a soft start is typically used for large loads like a motor or compressor. As can be seen in FIG. 1, the power is gradually increased during the startup event allowing the generator to supply the load requirement. Unfortunately, this may not mitigate the issue with the reactive component of the load current profile. The presence of the large magnitude reactive component may cause the voltage regulator of the engine/generator set to alter the load bus voltage and frequency, which may cause the generator to trip off. To compensate for the reactive component of the load current, attempts to add compensating capacitor VAR compensation have been tried. The switching in/out of a large capacitor or maintained presence on the load bus may cause other stability issues with the engine/generator set regulators.

In some embodiments, an SSG can offer a solution that supplies load transients required by the load but isolates the engine/generator set from instantaneous load current demands and allows the engine/generator set to respond at a lower rate of load application. In response to a reactive load step, the SSG can supply a reactive component of the load current that can help isolate the engine/generator set from the issues with excessive reactive current. A change in frequency may be detected at the terminals of the SSG, and the SSG may responsively limit the rate of change of frequency by supplying power from the energy store to the load. As the engine/generator set assumes more of the load, the SSG can reduce the power supplied until the load is supported solely by the engine/generator set. Observing at the terminals of the SSG, the voltage change can be limited by supplying reactive power and decreasing the supplied reactive power as the bus voltage recovers.

Figure 4:
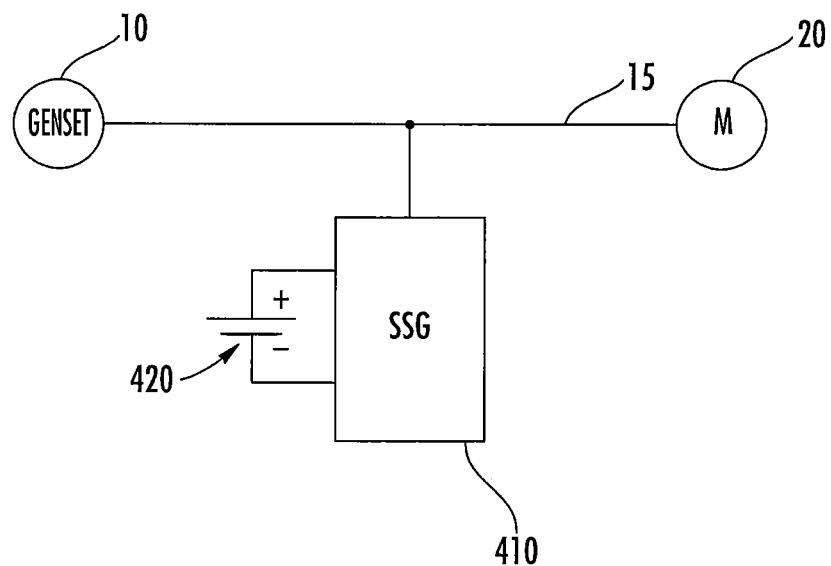
FIG. 4 is a block diagram illustrating an engine/generator set (G), motor (M) and Solid State Generator (SSG) according to some embodiments of the inventive subject matter.

FIG. 4 is a simplified block diagram illustrating an application of an SSG according to some embodiments. An engine/generator set 10 supplies power to a motor load 20 via an AC bus 15, which may be, for example, an island grid or other power distribution grid. An SSG 410 may include a 3-phase DC/AC power converter having 5 power terminals; positive, negative terminals coupled to an energy store 420 and three terminals coupled to respective phases of the AC bus 15 through respective inductors. Although the SSG 410 is shown connected to a battery, the energy store 420 can take any of a number of different forms, such as a lithium-ion battery bank, ultra capacitor bank, flywheel storage or the like. It should also be understood that a DC/DC converter can be used to interface the energy store 420 with the DC/AC power converter of the SSG 410. This can improve use of the energy store 420, since the terminal voltage of the energy store 420 can be different than the voltage of the DC bus used by the DC/AC power converter. The DC/DC converter is connected between the energy store 420 and the positive and negative terminals (DC bus) used by the DC/AC power converter bus that can deliver or receive power from the AC bus. The bidirectional DC/AC power converter of the SSG 410 is capable of using the DC bus and producing 3-phase AC voltages to support the load and it can transfer power from the AC bus 15 to the DC bus. Therefore, the 3-phase converter can look like a source or load depending on how the legs are controlled.

The SSG 410 connects to the AC bus 15 and can provide millisecond response times for power and reactive components of the load 20. This millisecond response time can mask the real load transients from the engine/generator set 10 so the voltage and frequency of the AC 15 remain in specification.

Figure 5:
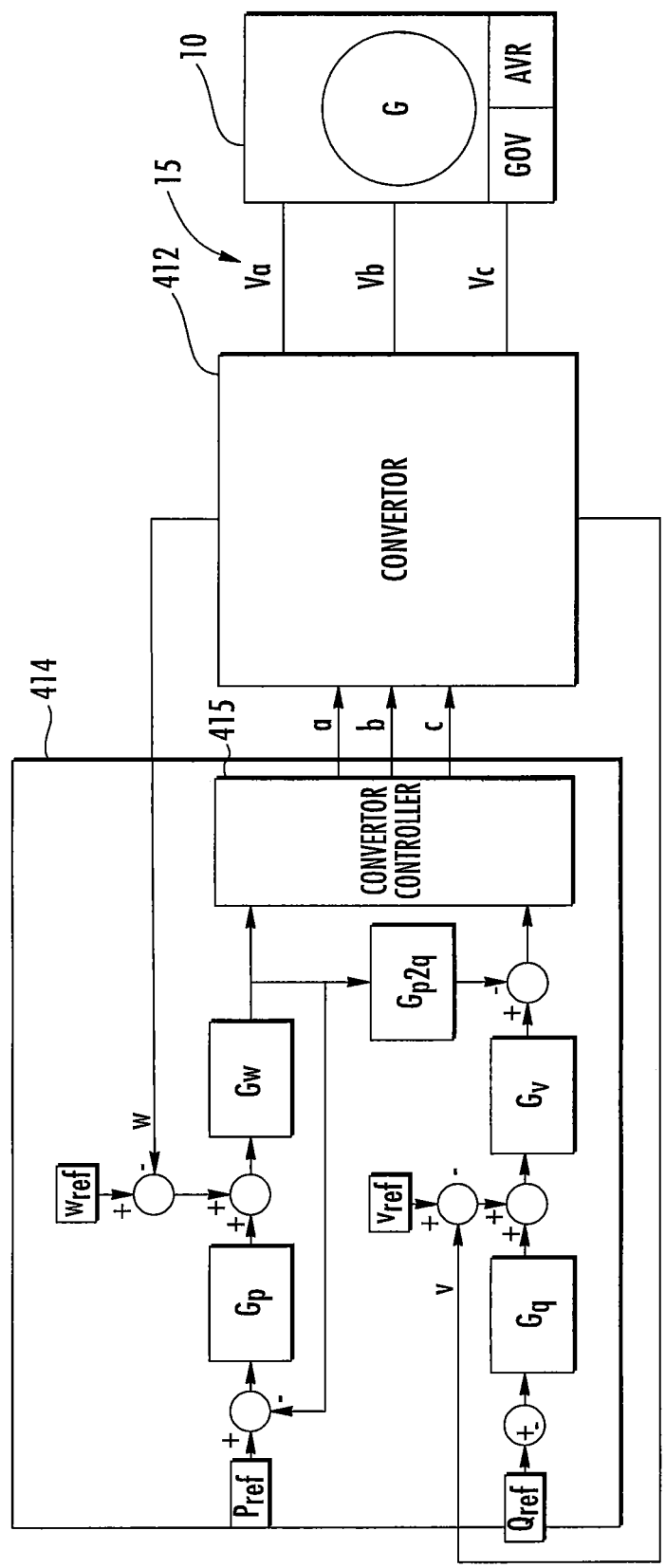
FIG. 5 is a block diagram illustrating a simplified SSG controller according to further embodiments.

FIG. 5 illustrates a controller 414 that may be used to control the DC/AC converter 412 of the SSG 410. The controller 414 includes a converter controller 415 that generates control signals a, b, c for operating switching circuitry in the converter 412 to control output phases that are applied to an AC bus 15 driven by a motor/generator set 10 and having respective phase voltages Va, Vb, Vc. The controller 414 has an inner frequency loop that can detect a transient frequency and generate a frequency command signal P for the converter controller 415 responsive to which the DC/AC power converter 412 provides real power that is needed to compensate the system before the engine/generator set takes its slow response. An outer power control loop provides an input to the inner frequency loop and has a loop compensation of $G_P$, which may have a transfer function of the form $Kp1/(1+Tp1*s)$, where Kp1 and Tp1 are constants. A reference input $P_{ref}$ for the power control loop can, for example, be set to zero such that the controller transiently provides power when the frequency of the AC grid deviates from a reference frequency $w_{ref}$. A power control loop structure along such lines is explained in U.S. Patent Application Publication No. 2014/0103727 to Taimela et al., the content of which is hereby incorporated by reference in its entirety.

According to some embodiments, the controller 414 further implements an inner voltage loop that detects a transient voltage and generates a voltage command signal Q for the controller 415 responsive to which the DC/AC power converter 412 provides a reactive component that is needed to compensate for the load demand before the engine/generator set is capable of responding. An outer reactive component control loop having a loop compensation $G_Q$ (which may have a transfer function of the form Kq1/(1+Tq1*s), where Kq1 and Tq1 are constants) provides an input to the inner voltage loop responsive to a reactive component reference signal $Q_{ref}$. As the impedance network typically is not that complex in an island power system, once a reactive component demand step occurs as indicated by a deviation of an output voltage v of the converter 412 with respect to a reference voltage $v_{ref}$, the SSG 410 can relatively quickly respond and compensate the reactive component to the bus, in order to regulate the bus voltage under the massive reactive component changes. This compensation method is usually sufficient under such massive reactive component step loadings. However, the effects of a bus voltage deviation due to a power load step, which may reduce the bus voltage, may be decoupled by adding a frequency dependent bus voltage change to the reactive component compensation so no error signal is generated to a power component only step load. This decoupling compensator is shown in FIG. 5, coupled between P Command and Q command.

For power control, the inner frequency loop detects bus frequency deviation and delivers/absorbs power through the fast compensator. The gain of the inner frequency loop may be set based on the frequency deviation requirement and the inertia of the system. In a relatively low inertia system, such as an island micro-grid, the active load step may create much more frequency deviation and, therefore, a smaller gain may be required. The gain $G_w$ of inner frequency loop may be estimated calculated using the following equation:

$$G_w = \frac{\Delta P_e}{\Delta w}, \quad \text{Eqn. (2)}$$

where $\Delta w$ is the target frequency deviation. The gain $G_w$ may have a transfer function of the form Kp2/(1+Tp2*s), wherein Kp2 and Tp2 are constants.

The outer power control loop provides steady state power flow control. In normal steady state, when there is no transient deviation in the bus, the SSG 410 delivers substantially no power into the bus, which may reduce semiconductor losses and extend the system lifetime. The power reference may be set negative during a charging state in order to let the generator slowly charge up the energy store 420. This may be done during periods in which transient load step conditions are not present. In some modes, recharge of the energy store 420 may be delayed for power peak-shaving. The duration of peak-shaving function may be based on the size and state of charge of the energy store 420.

Power and reactive components can impact the voltage stability. As the reactive component may be the major reason for voltage instability, a fast inner voltage loop may be implemented for reactive VAR compensation. The gain of the inner reactive component compensation $G_v$ may be estimated using the following equations:

$$G_v = \frac{\Delta Q_e}{\Delta v}, \quad \text{Eqn. (3)}$$

where $\Delta v$ is a target voltage deviation range, or $$G_v \approx \frac{1}{X}, \quad \text{Eqn. (4)}$$

where X is the reactance of the system. $G_v$ may have a transfer function of the form Kq2/(1+Tq2*s), where Kq2 and Tq2 are constants.

In some embodiments, in order to cancel out the voltage influence from the power component, a feed-forward path may be provided from the power error signal to the reactive component error signal. Thus, if only the power demand causes the voltage drop, injection of reactive component will be inhibited to reduce disturbance of the system. Gain of this crossover feedforward may be given by the following equation:

$$G_{p2q} \approx \frac{R}{X}, \quad \text{Eqn. (5)}$$

where R is the resistance of the system. The crossover feedforward gain $G_{p2q}$ may have a transfer function of the form Kpq/(1+Tpq*s), wherein Kpq and Tpq are constants.

Since the reactive component may not provide any benefit in the steady state when there is no voltage deviation, the outer slow reactive component loop may be configured to substantially zero the reactive component in the long-term in order to reduce the loss and extend the lifetime of the SSG 410. If the transient conditions remain short, system cost may be reduced by sizing components based on overload ratings. For example, it may be possible to use 5MVA rated devices for a 10MVA transient requirement.

Understanding that the compensation for the reactive component does not require any substantial energy storage, the SSG 410 can provide some level of continuous reactive component in addition to the transient capability. In particular, the SSG 410 can be commanded to provide a fixed level of reactive component compensation resulting in reduced reactive component handled by the engine/generator set.

Reactive components from large motors tend to be primarily at the fundamental frequency. However, other types of reactive components can be harmonically related to the fundamental. These harmonically related reactive components are typically produced by loads that have non-sinusoidal current draw. The resultant current waveform can be simplified using a Fourier series analysis into a series of simple sinusoids that occur at integer multiples of the fundamental frequency. Therefore reactive components can be step applied as in a large motor starting event or a temporary or sustained reactive component due to non-sinusoidal current draw from a load. Accordingly, reactive compensation as described herein applies to fundamental and harmonic components. It will be further understood that reactive compensation techniques as described herein may be used to compensate for reactive loads other than motor loads, such as for capacitors that are switched in and out of the grid. For example, techniques along the lines described herein may be used to compensate for other reactance coupled to the grid and may be used in conjunction with other compensation techniques, such as reactive compensation capacitors connected to the grid.

The controller 414 may include digital hardware, such as a processor and field programmable gate array FPGA using a CompactRio or MicroZed™ control platform.

In the drawings and specification, there have been disclosed exemplary embodiments of the inventive subject matter. However, many variations and modifications can be made to these embodiments without substantially departing from the principles of the present inventive subject matter. Accordingly, although specific terms are used, they are used in a generic and descriptive sense only and not for purposes of limitation, the scope of the inventive subject matter being defined by the following claims.

That which is claimed is:

1. A system comprising:
a converter configured to be coupled between an energy storage unit and a grid;
a converter controller configured to control the converter responsive to a real power command and a reactive power command that respectively cause the converter to transfer a real power component and a reactive power component; and
a control circuit configured to detect frequency and voltage variations of the grid and to responsively generate the real power command and the reactive power command, wherein the control circuit implements:
a real power control loop configured to generate the real power command responsive to a frequency of the grid and a real power reference; and
a reactive power control loop configured to generate the reactive power command responsive to a voltage of the grid, a reactive power reference and a feedforward of the real power command.

2. The system of claim 1, wherein the real power control loop produces the real power command responsive to a measured frequency and wherein the reactive power control loop is coupled to the real power control loop by a crossover gain that receives the real power command and provides the feedforward.

3. The system of claim 1, wherein the feedforward of the real power command inhibits reactive component transfer between the converter and the grid in response to a voltage variation deviation of the grid due to a change in real power demand on the grid.

4. The system of claim 1, wherein the real power and reactive power loops are configured to drive real power and reactive power transfers by the converter to substantially zero when a frequency and a voltage of the grid meet predetermined criteria.

5. The system of claim 1, wherein the control circuit is configured to provide real power flow from the grid to the energy storage unit by varying a power reference provided to the real power control loop when the frequency and the voltage of the grid meet the predetermined criteria.

6. The system of claim 1, wherein the control circuit is configured to cause the converter to maintain a frequency and a voltage of the grid within ranges that prevent shutdown of an engine/generator set driving the grid in response to a startup of a motor coupled to the grid.

7. The system of claim 1, wherein the control circuit is configured to detect transient frequency and voltage variations of the grid associated with a startup of a motor load on the grid and to responsively cause the converter to transfer real power and reactive power until the voltage and the frequency of the grid reach a predetermined state.

8. A method comprising:
a real power control loop generating a real power command responsive to a frequency of a grid and a real power reference;
a reactive power control loop generating a reactive power command responsive to a voltage of the grid, a reactive power reference and a feedforward of the real power command from the real power control loop; and
a converter transferring real power and reactive power between an energy storage device and the grid responsive to the real power command and the reactive power command respectively.

9. The method of claim 8, wherein the real power control loop produces the real power command responsive to a measured frequency and wherein the reactive power control loop is coupled to the real power control loop by, a crossover gain that receives the real power command and responsively provides the feedforward.

10. The method of claim 8, wherein the feedforward of the real power command inhibits reactive component transfer between the converter and the grid in response to a voltage variation deviation of the grid due to an increase in real power demand on the grid.

* * * * *

UNITED STATES PATENT AND TRADEMARK OFFICE
CERTIFICATE OF CORRECTION

PATENT NO. : 10,574,055 B2
APPLICATION NO. : 15/539772
DATED : February 25, 2020
INVENTOR(S) : Mengben et al.

Page 1 of 1

It is certified that error appears in the above-identified patent and that said Letters Patent is hereby corrected as shown below:

In the Claims

Column 10, Claim 9, Line 37: Please correct "by, a" to read -- by a --

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*